Patented Mar. 29, 1932                                                        1,851,822

UNITED STATES PATENT OFFICE

EDUARD FÄRBER, OF HEIDELBERG, GERMANY, ASSIGNOR TO HOLZHYDROLYSE AKTIEN-GESELLSCHAFT, OF HEIDELBERG, GERMANY

PROCESS FOR THE SACCHARIFICATION OF VEGETABLE MATERIAL CONTAINING PENTOSANS

No Drawing. Application filed June 25, 1930, Serial No. 463,818, and in Germany May 21, 1929.

The present invention relates to the saccharification of vegetable material containing pentosans.

All the processes hitherto known for chemically disintegrating highly condensed carbohydrates of vegetable origin by concentrated acids are based on the simultaneous saccharification of all the saccharifiable constituents of the material. In the case of vegetable material rich in pentosans, such as straw, oat husks, cane sugar waste, leaf-wood, it may be advantageous, however, to saccharify the pentosans apart from the cellulose proper.

Not only are the strongly acid sugar solutions obtained from the disintegration process rather unstable when they contain large amounts of pentoses, whereby darkening, precipitations, and the formation of volatile by-products is caused, but it is also more valuable in many cases to have solutions on the one hand of the pentoses alone and on the other hand of hexoses containing only a very small portion of pentoses, instead of a mixture of hexoses and pentoses as has been usual heretofore.

It is known to produce solutions of pentosans by treating the latter with alkaline liquids. Such a treatment, however, would not suit the purpose of this invention; the yield would be too low, the pentosans would pass into solution without being converted into sugar and, on account of swelling of the mass, filtration and washing would be rendered difficult.

Processes are also known for the production of pentoses in a pure state by treating the raw material with very dilute acids preferably under high pressure and at high temperature. This procedure, if carried out on a large scale, gives rise to difficulties as regards apparatus and, moreover, all the non-pentose-like carbohydrates are destroyed by such treatment.

According to the present invention the pentosans contained in the raw material can, for the greater part, be separated therefrom and be saccharified like the cellulosic constituents, but independently of the latter. Disintegration in this case is commenced at normal or slightly elevated temperature with concentrated hydrochloric acid of comparatively low concentration which dissolves pentosans and converts them into sugar. The concentration of the hydrochloric acid in this first operating stage has to be adapted in each case to the material to be saccharified. A favourable concentration, for example for dissolving the pentosans from oat-husks, is 26% HCl by weight; bagasse requires 28%, and oakwood e. g. 37%. For the disintegration of the cellulose-like carbohydrates hydrochloric acid of the highest concentration (40% by weight and more) is used in the second operating stage as usual.

In order to obtain in this way on the one hand concentrated solutions of pentoses with but a small hexose content and on the other hand concentrated solutions of hexoses containing only a small quantity of pentoses, the following mode of operation may be employed: The dried vegetable material to be saccharified is mixed with about 0,8–1 part of moderately concentrated hydrochloric acid, selected according to the raw material used, and the mixture is allowed to stand for a time suitably chosen according to experience and is then transferred to the diffusion battery. By adding hydrochloric acid of 40%, the weaker acid adhering to the mixture introduced into the diffuser is displaced and can be used again to dissolve the pentosans from a fresh batch of raw material. This may be repeated three times or more until the solution has acquired such a concentration that it has only a very poor solvent power for the pentosans left. The greater part of the solution is then eliminated and the remainder, in admixture with fresh moderately concentrated hydrochloric acid, is used further on. The concentrated solutions of the pentoses are drawn off and, by treating the residue with highly concentrated hydrochloric acid, solutions containing mainly hexoses are obtained in the usual way.

The mode of operation herein described has the further advantage that by the preliminary treatment with the weaker hydrochloric acid the raw material diminishes in bulk and thus permits a better utilization per unit of space of the disintegration vessel.

In order to overcome the difficulties arising in displacing the pentose solution by 40% acid, it may be advisable in some cases to remove the acid pentose solution by washing with water and, after drying the residue, to allow the 40% hydrochloric acid to act upon it.

According to a special mode of carrying out the process an acid may be used for the first operating stage the concentration of which is but little below 40% by weight, e. g. 36–39% HCl. In this case, the quicker saccharification of the pentosans is made use of to separate them from the hexoses. If, for instance, oat-husks are treated with hydrochloric acid of 37%, the greater part of the pentoses, but very little of the carbohydates forming hexoses, is dissolved within half an hour. By working in this way in a diffusion battery, highly concentrated hexose solutions can be procured in the second operating stage much easier and quicker with the aid of 40% hydrochloric acid, thanks to the preliminary treatment with an almost equally concentrated hydrochloric acid.

What I claim is:

1. A process for saccharifying vegetable material rich in pentosans consisting in first dissolving the major part of the pentosans with the aid of hydrochloric acid of moderate concentration, about 25–38% HCl by weight according to the material used, and then further disintegrating the residue with hydrochloric acid of highest concentration (40%), as set forth.

2. A process as claimed in claim 1, in which a diffusion battery is utilized and the preliminary treatment of the raw material with the weaker hydrochloric acid takes place before putting the mass into the diffusion battery, as set forth.

3. A process as claimed in claim 1, consisting in preliminarily treating the raw material with moderately concentrated hydrochloric acid of 25–38 wt.-%HCl, washing, and drying the resulting pentosan-free product and submitting the residue to the action of highly concentrated hydrochloric acid containing about 40% HCl, as set forth.

4. A process as claimed in claim 1 in which hydrochloric acid having a concentration a little below 40% HCl by weight, e. g. about 36–38%, is allowed to act for a short while upon the raw material in the first operating stage whereby mainly pentoses go into solution, as set forth.

In testimony whereof I have signed my name to this specification.

EDUARD FÄRBER.